United States Patent Office 2,843,622
Patented July 15, 1958

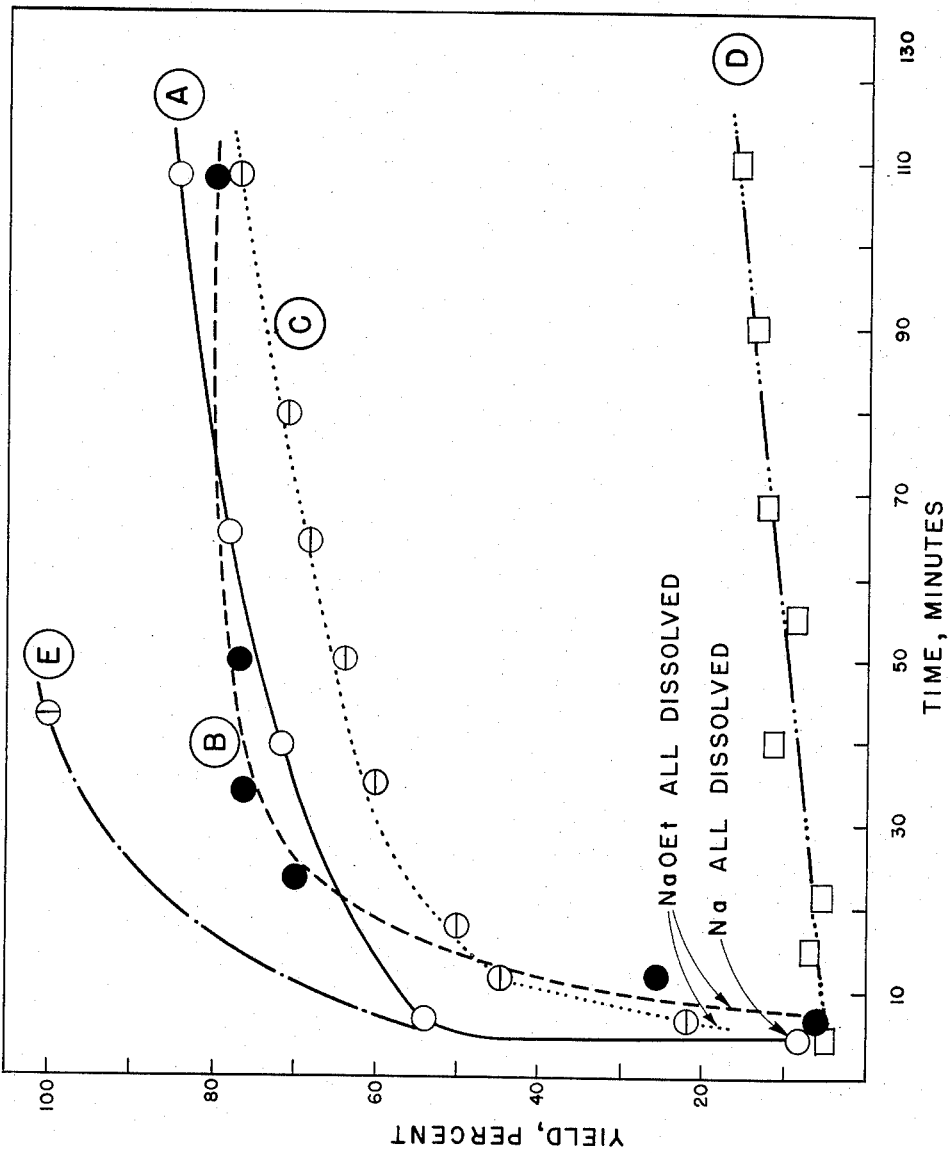
*INVENTOR.*
Virgil L. Hansley
Stuart Schott
BY E. Janet Berry

2,843,622

CONDENSATION OF ETHYL ACETATE

Virgil L. Hansley and Stuart Schott, Cincinnati, Ohio, assignors to National Distillers and Chemical Corporation, New York, N. Y., a corporation of Virginia Application January 28, 1954, Serial No. 406,870

1 Claim. (Cl. 260—483)

This invention relates to improvements in the Claisen condensation and, more specifically, to a novel process whereby the yield of ethyl acetoacetate by the self-condensation of ethyl acetate is improved and the speed of the reaction is greatly increased.

This condensation may be effected by heating an excess of ethyl acetate in the presence of a basic condensing agent. For example, metallic sodium reacts in accordance with the following equation, (1) 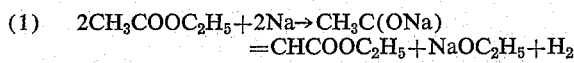
$$2CH_3COOC_2H_5 + 2Na \rightarrow CH_3C(ONa)=CHCOOC_2H_5 + NaOC_2H_5 + H_2$$

It is also known that the self-condensation of ethyl acetate may be effected to some extent by refluxing in the presence of an alkoxide, such as sodium methoxide or sodium ethoxide, presumably in accordance with the following equation, (2) 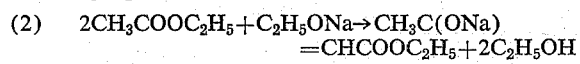
$$2CH_3COOC_2H_5 + C_2H_5ONa \rightarrow CH_3C(ONa)=CHCOOC_2H_5 + 2C_2H_5OH$$

It will be noted that according to Equation 1 above, two atoms of sodium are required to produce one molecule of ethyl acetoacetate whereas according to Equation 2 or the combination of Equations 1 and 2, only one atom of sodium is required for the production of one molecule of ethyl acetoacetate.

Although many studies have been carried out, it was not known how to operate the condensation on a commercial scale in order to achieve high yields in a reasonable and practical reaction time cycle. It has heretofore been possible in commercial operations to obtain the full benefit of this increase in productivity of sodium only by an extremely long reaction period. For example, commercial methods for the production of ethyl acetoacetate from ethyl acetate and sodium require nearly 20 hours of reaction time in order to accomplish a practical yield. Even after that period, the yields are 55–80% and there is some unchanged sodium which requires special handling.

These commercial processes have hitherto generally used metallic sodium in the form of bricks, chunks, wire or globules of substantial size. Among the causes of the overlong reaction time may possibly be (1) a crusting over of the sodium but more particularly (2) the removal of the alkoxide base from solution by complex formation with product sodioacetoacetic ester.

It has now been discovered that practically quantitative yields of acetoacetic ester, based on the amount of sodium employed, can be obtained. This novel method, which leads to surprisingly high yields comprises the steps of carrying out the reaction of dispersed sodium with ethyl acetate in an excess of the refluxing ester at 78° C. After the entire amount of the sodium has dissolved, which process required only a few minutes, the reaction mixture is transferred into suitable pressure equipment and additionally heated at 100° C. This is a temperature substantially above the boiling point (78° C.) of ethyl acetate. It is also possible to produce substantially the same effect by using a sodium alkoxide such as sodium methoxide or sodium ethoxide as the basic condensing agent, and carrying out a similar heating step in order to complete the reaction.

By operating in this fashion, it is possible to increase the production of ethyl acetoacetate from a given amount of metallic sodium, even up to the theoretical yield of one molecule of the ester per atom of sodium. It is obvious that the described process represents a great advance over the prior art on commercial operation of this reaction.

The use of sodium dispersions, or emulsions, in which the sodium particles are of the order of 1 to 15 microns in size, results in a rapid solution of the sodium at the boiling point of ethyl acetate (78° C.). This also is a great advantage. The prolonged reaction period heretofore found necessary in order to assure completion of the reaction resulted in side reactions or further condensation products on the ethyl acetoacetate already formed which lowered the yield of desired product.

After the sodium has dissolved, a period varying from a few minutes to an hour or so, depending upon the temperature of reaction, the resulting solution is heated to about 100° C. for a short period of time. In the preparation of ethyl acetoacetate from ethyl acetate, this necessitates heating under pressure. Heating in this manner for a period of one-half hour to an hour is generally sufficient.

Although the effect is not completely understood, it is suggested that heating to the elevated temperature breaks down an intermediate complex compound formed from the remaining sodium alkoxide and the sodio ethyl acetoacetate already formed. Thus, at the half-way point of the reaction, all the remaining basic alkoxide required as catalyst, is tied up in a much less alkaline coordination complex between these two materials. It is not intended, however, to limit the invention to any particular theory. Regardless of the correctness of this explanation, there results in the heated solution a formation of ethyl acetoacetate in substantially quantitative yield, which is not otherwise obtainable.

The most satisfactory manner by which to accomplish the complete utilization of the sodium and obtain the high yields of desired product, is to finish the reaction in a pressure vessel. It has been attempted to increase the reaction temperature by the use of high boiling solvents for the reaction. These were unsatisfactory because of the insolubility of ethyl acetate and product sodioacetoacetate in such solvents as toluene, xylene, and kerosene. Further, it is greatly preferred to carry out the condensation using a substantial excess of ethyl acetate to serve as a reaction medium for the reaction. A 4 to 7 molar excess of ethyl acetate, over the amount consumed in the reaction, is satisfactory.

The use of this invention is not limited to its applicability in the sodium-ethyl acetate system but is also of similar value in the sodium alkoxide-ethyl acetate system, in each case using ethyl acetate as the solvent.

While the effect of such increased temperatures on the solutions formed by reacting massive sodium and ethyl acetate, as has been shown in the prior art, is similarly to increase somewhat the production of ethyl acetoacetate, the final yield is never as high because of the side reactions resulting from the longer solution period. It is evident therefore that while in theory the process of the invention is applicable to solutions prepared by reacting sodium of any particle size with ethyl acetate, as a practical matter, no feasible manner of obtaining nearly theoretical yields is available other than the use of sodium of approximately 1 to 15 microns in size.

As an example of the speed with which dispersed sodium of 5–15 micron size reacts with ethyl acetate, it was found that when 0.34 mole of sodium was added to 4.8 moles refluxing ethyl acetate dissolution of the sodium was complete in three minutes.

The invention will be described in greater detail by the following examples although it is not intended to limit the scope of the invention strictly thereto. All parts are by weight unless otherwise stated. These examples will be better understood by reference to the accompanying figure.

EXAMPLE 1

The sodium dispersions used were prepared by the use of suitable high speed stirring devices which are commercially available. In carrying out the preparation, about 400 parts of sodium and 400 parts of dispersing medium such as toluene, xylene, kerosene, mineral oil or other suitable inert liquid were charged into a reaction vessel. About four parts of a dispersing aid such as oleic acid was also added. This total charge was then heated to about 105° C., and the stirring started. The metallic color of the sodium was gradually replaced by a uniformly gray color. The particle size of the sodium attained was generally in the 1 to 15 micron range. The dispersion was preferably cooled considerably below the melting point of the sodium for either immediate use or for storage for further use.

The sodium alkoxide such as sodium ethoxide may be prepared by the dropwise addition of a 50% sodium dispersion in xylene to the stirred, refluxing solution of an equimolar amount of ethyl alcohol in xylene. Dilution should be such that a 30% slurry of the alkoxide in xylene results. Complete conversion of the sodium to the sodium alkoxide was indicated by the evolution of the theoretical amount of hydrogen.

In the series of experiments shown in the accompanying figure, the dispersed sodium or sodium ethoxide was added to refluxing ethyl acetate in the reaction vessel. The reaction mixture was suitably agitated, and, where indicated, it was maintained at the reflux temperature of ethyl acetate which is about 78° C. Five experiments were carried out as indicated in the figure. In experiment E, after the sodium dissolved in the ester in a period of under ten minutes, the hot reaction mixture was transferred immediately into a pressure bomb reactor. It was found that some advantage was gained by preheating the bomb before introducing the reaction mixture.

Experiments A and B show the comparison between the relative activities of sodium and sodium ethoxide as condensing agents at 78° C. Up to the halfway point of the reaction, the sodium appears to be only slightly more effective, and it should be noted that during the earlier stage of the reaction, both alkalies cause the condensation to proceed quite rapidly. After about 50% reaction the rates of reaction with both condensing agents become very slow. Experiment C shows that the addition of an equimolar excess of ethyl alcohol added at the beginning of the reaction had little or no effect on the rate. Experiment D in using pure, dry preformed ethyl sodioacetoacetic ester added at the start of the reaction in an amount substantially equivalent to the sodium ethoxide added as the condensing agent gave, from the start, the same slow rate of reaction shown to take place in the other examples after 50% of the base had reacted. In experiment E, by heating the reaction mixture to 100° C., the reaction proceeds to completion substantially at the initial rapid reaction rate.

EXAMPLE 2

Temperatures somewhat higher than 100° C. were examined but experiments showed that a temperature of 140° C. was unsatisfactory. Temperatures of 120° C. and above tended to decompose the product acetoacetic ester with correspondingly lower yields of final products. This was accompanied by an undesirable increase in polymeric products because of further condensation reactions under the strongly alkaline reaction mixture. Results of the experiments showing this effect are tabulated in Table 1.

Table 1

| Expt. No. | Time for Na to Dissolve, Hour | Reaction Time in Autoclave, Hour | Max. Temp., °C. | Total Time, Hours | Yield, percent | G. Polymer/G. Atom Na |
|---|---|---|---|---|---|---|
| 1a | 0.25 | 1.0 | 140 | 2.3 | 63 | 20.5 |
| 2a | 0.33 | 1.0 | 120 | 2.25 | 70 | 10.0 |
| 3a | 0.25 | 1.0 | 100 | 1.50 | 79 | 7.6 |
| 4 | 0.25 | 0.5 | 100 | 1.30 | 85 | 7.2 |
| 5b | 0.15 | 0.5 | 100 | 1.2 | 73 | 6.0 |
| 6c | 0.25 | 0.5 | 100 | d 0.75 | 97 | |
| 7a | 0.25 | 0.5 | 100 | d 0.75 | 100 | | a Mole ratio Na:ester=1:7.3.
b Mole ratio Na:ester=1:3.66.
c Mole ratio Na:ester=1:6.9.
d Bomb preheated to 100°, thus less total time required.

EXAMPLE 3

Into a reaction vessel equipped with a heating mantle, a reflux condenser, a stirrer, a valved inlet tube and a tube for withdrawal of the reaction mixture, was placed 7.3 parts of ethyl acetate. The temperature was raised to the boiling point (78° C.) and approximately .46 part of dispersed sodium, containing .23 part of sodium, was introduced over a period of approximately 10 minutes. The sodium was entirely dissolved in 15 minutes.

The reaction mixture, completely in solution, was withdrawn by suction into a Parr pressure bomb equipped with internal heating coils and a sampling tube. Steam was admitted to the heating coils so as to keep the contents of the closed bomb at 100° C. The pressure was about 20 p. s. i. The mixture was maintained at 100° C. for one-half hour.

The ethyl acetoacetate in the reaction liquid was determined by withdrawing aliquot samples and neutralizing them by addition to an excess of glacial acetic acid. The acidified samples were distilled to dryness under reduced pressure to volatilize the ester from the by-product salt.

Ethyl acetoacetate was determined in the distillate by the hydroxylamine hydrochloride method. This indicated the presence of 1.26 parts of ethyl acetoacetate based on the ethyl acetate in the starting reaction mixture. This corresponds to a yield of 97%.

What is claimed is:

In a process in which ethyl acetate is subjected to self-condensation in the presence of a base, the improvement which comprises the steps in combination of reacting ethyl acetate in a 4 to 7 molar excess over the theoretical amount required for the condensation with dispersed metallic sodium having a particle size of 1 to 15 microns initially at a temperature of about 78° C., maintaining the temperature at about 78° C. until the sodium has substantially completely dissolved, and thereafter raising the temperature of the reacting mixture during the completion of the reaction period to about 100° C. under superatmospheric pressure of from 15 to 60 p. s. i.

References Cited in the file of this patent

UNITED STATES PATENTS 1,805,281    Halbib et al.       May 12, 1931

OTHER REFERENCES

"Organic Reactions," I, 281 and 290, J. Wiley, 1942.
B. I. O. S. Final Report No. 1054, Dec. 20, 1946, p. 10.